United States Patent
Suzuki et al.

[11] Patent Number: 5,880,569
[45] Date of Patent: Mar. 9, 1999

[54] MOTOR FOR USE IN INFORMATION RECORDING DEVICE

[75] Inventors: Yuzuru Suzuki, Shizuoka; Sakae Fujitani, Hamakita; Yoshiyuki Aono, Shizuoka, all of Japan

[73] Assignee: Minebea Co., Ltd., Nagano, Japan

[21] Appl. No.: 844,387

[22] Filed: Apr. 18, 1997

[30] Foreign Application Priority Data

May 9, 1996 [JP] Japan .................................. 8-114044

[51] Int. Cl.⁶ ...................................................... H02P 8/00
[52] U.S. Cl. ........................ 318/696; 318/685; 318/432; 369/263
[58] Field of Search ................................ 318/696, 685, 318/432, 433; 360/73.01, 3; 369/239–241, 263

[56] References Cited

U.S. PATENT DOCUMENTS

| | | | |
|---|---|---|---|
| 4,115,726 | 9/1978 | Patterson et al. | 318/722 |
| 5,048,005 | 9/1991 | Ekhoff | 369/270 |
| 5,304,879 | 4/1994 | Suzuki et al. | 310/67 R |
| 5,321,340 | 6/1994 | Tamaki et al. | 318/696 |
| 5,528,570 | 6/1996 | Kondo | 369/48 |
| 5,691,583 | 11/1997 | Suzuki et al. | 310/49 R |

*Primary Examiner*—Brian Sircus
*Attorney, Agent, or Firm*—Howell & Haferkamp, LC

[57] ABSTRACT

An information recording device is provided, whereby an inexpensive stepping motor is used to drive a recording disk for recording information, the disk being driven under open-loop control by means of inexpensive digital circuit technology, without employing rotor position detectors or a speed detector, and the rotational accuracy of the recording disk is raised to a level suitable for application, without increasing cost, by constituting the aforementioned step operation (having poor rotational accuracy) inherent in the stepping motor such that certain relationships are formed between the structural parameters of the information recording device and the structural parameters of the motor. In a stepping motor, electrical energy is supplied by switching excitation at a timing synchronized to an input clock, regardless of the load. When this electrical energy is converted to mechanical energy, the moment of inertia of the rotating portion is exploited to a maximum in order to produce smooth rotation.

20 Claims, 6 Drawing Sheets

MOTOR FOR USE IN INFORMATION RECORDING DEVICE

BACKGROUND OF THE INVENTION

1. Field of the Invention

The present invention relates to a motor for use in an information recording device, such as an FDD, for example, which accesses information by rotating a disk-shaped recording medium at a constant speed, and in particular, it relates to a spindle motor which drives a recording medium directly.

2. Description of the Related Art

An FDD (Floppy Disk Drive) is used for writing and reading information to and from a disk-shaped information recording medium, known as a floppy disk, used in word processors and personal computers. In the prior art, generally, a brushless DC motor has been employed as the spindle motor for driving rotation of a floppy disk in an FDD. Brushless DC motors present no problems whatsoever in terms of performance or reliability, but since they require rotor position detectors and a speed detector, the motors themselves are unavoidably expensive. Moreover, feedback control of the rotational speed is required in the drive, in order to ensure rotational accuracy, and hence the circuit composition becomes large in size, and such systems have been unable to meet recent demands for cost reduction. In particular, the spindle motor represents a large cost element in the device, and lowering the cost of the spindle motor has become an important objective.

On the other hand, due to the progress of digital electronics technology in recent years, it is possible to drive rotation using an inexpensive stepping motor (a two-phase claw pole motor is especially effective) as a synchronous motor which is synchronized to a clock by means of a simple drive circuit. Furthermore, since a digital drive circuit can be constructed without the inclusion of rotor position detectors or a speed detector in the motor, it has a merit in that the system as a whole can be constructed very inexpensively, and employment thereof is under investigation. However, there is large variation in the rotation of stepping motors due to the step movement of their basic operation, and in particular, in current circumstances, they cannot be employed as spindle motors for information recording devices where high rotational accuracy is demanded.

Furthermore, the use of circuit technology, such as micro-stepping or the like, in order to improve rotational accuracy, is also under study, but this has a drawback in that the cost of the drive circuit becomes extremely high.

SUMMARY OF THE INVENTION

With the foregoing in view, it is an object of the present invention to provide a motor for an information recording device, wherein an inexpensive stepping motor is used to drive a recording disk, the disk being driven under open-loop control by means of inexpensive digital circuit technology, without employing rotor positions detectors or a speed detector, and the rotational accuracy of the recording disk is raised to a level suitable for application, without increasing cost, by constituting the aforementioned step operation (having poor rotational accuracy) to be inherent in the stepping motor such that certain relationships are formed between the structural parameters of the information recording device (moment of inertia of total rotating portion, rotational speed of driven disk and required rotational accuracy) and the structural parameters of the motor such as basic step number and detent torque.

In a stepping motor, electrical energy is supplied by switching excitation at a timing synchronized to an input clock, regardless of the load. When this electrical energy is converted to mechanical energy, the moment of inertia of the rotating portion is exploited to a maximum in order to produce smooth rotation. In specific terms, each of the parameters is set such that the following conditions are satisfied.

In other words, taking the moment of inertia of the total rotating portion, as $J$ (g·cm$^2$), the rated rotational speed, as n (rps), the basic step number, as N (steps), the peak-to-peak value for the detent torque, as 2 Td (g·cm), and moreover, the peak-to-peak value for the rotational accuracy required in order to ensure data access for the device, as $\eta a$ (%), $\eta$ (%) is defined by formula (1), using the aforementioned parameters.

$$\eta = 2 \times 980 \times 100 \times Td/(N/2 \cdot J \cdot \omega^2) \quad (1)$$
$$= 98000 \, Td/(\pi^2 n^2 \cdot J \cdot N) \, (\%)$$

The motor is designed such that the relationship between the aforementioned rotational accuracy $\eta$ and the rotational accuracy $\eta a$ required in the device is:

$$\eta \leq \eta a.$$

The stepping motor can be caused to rotate sufficiently smoothly by designing a device such that the relationship above is satisfied, and as a result, the required rotational accuracy for the device can be achieved.

If a stepping motor according to the present invention is used as a spindle motor for an FDD information recording device, it is desirable for the moment of inertia $J$ (g·cm$^2$) of the total rotating portion of the motor, the basic step number N (steps), and the peak-to-peak value for the detent torque 2 Td (g·cm), to be set such that the rotational accuracy $\eta$ (%) is $0.3 \leq \eta \leq 1.2$.

Moreover, if the stepping motor according to the present invention is used as a 3.5-inch FDD spindle motor, it is desirable for the basic step number N to be $48 \leq N \leq 188$.

DETAILED DESCRIPTION OF THE PREFERRED EMBODIMENT

The present invention will now be described by reference to the drawings.

In the following description, a 3.5-inch FDD (Floppy Disk Drive) is taken as one example of an information recording device according to the present invention.

Figure 1A:
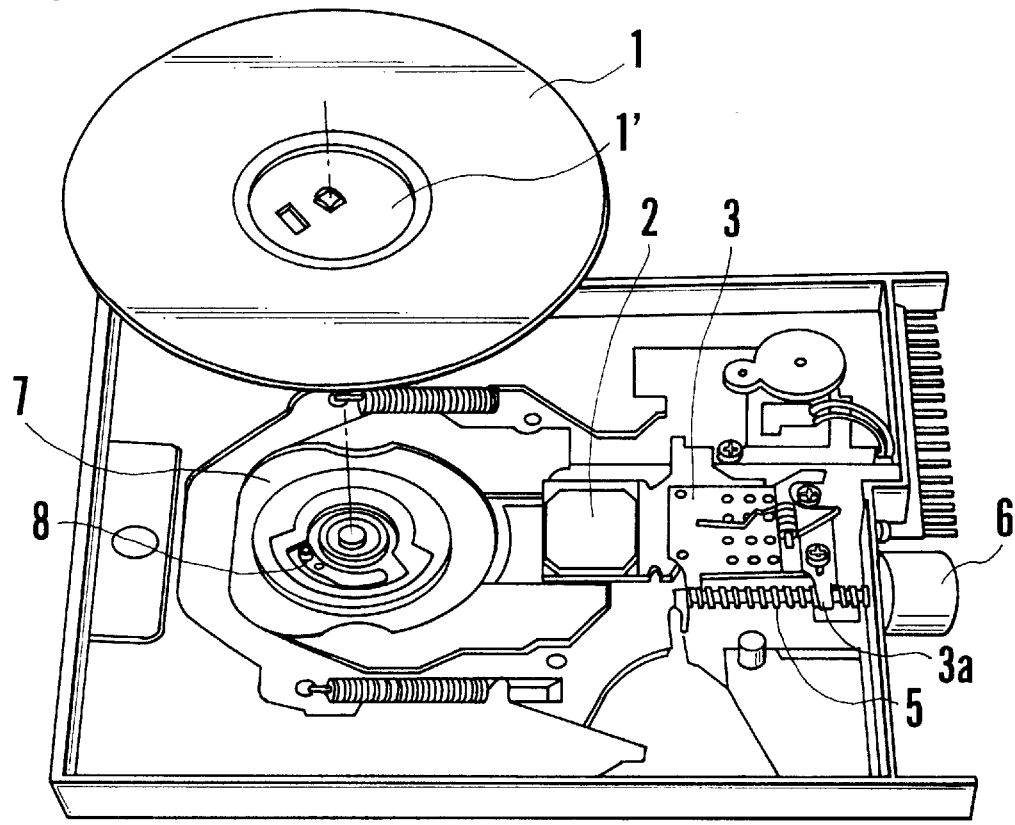
FIG. 1 shows an approximate structure of a 3.5-inch FDD: (a) with the recording disk in a released state; and (b) with the recording disk in an engaged state.
Figure 1B:
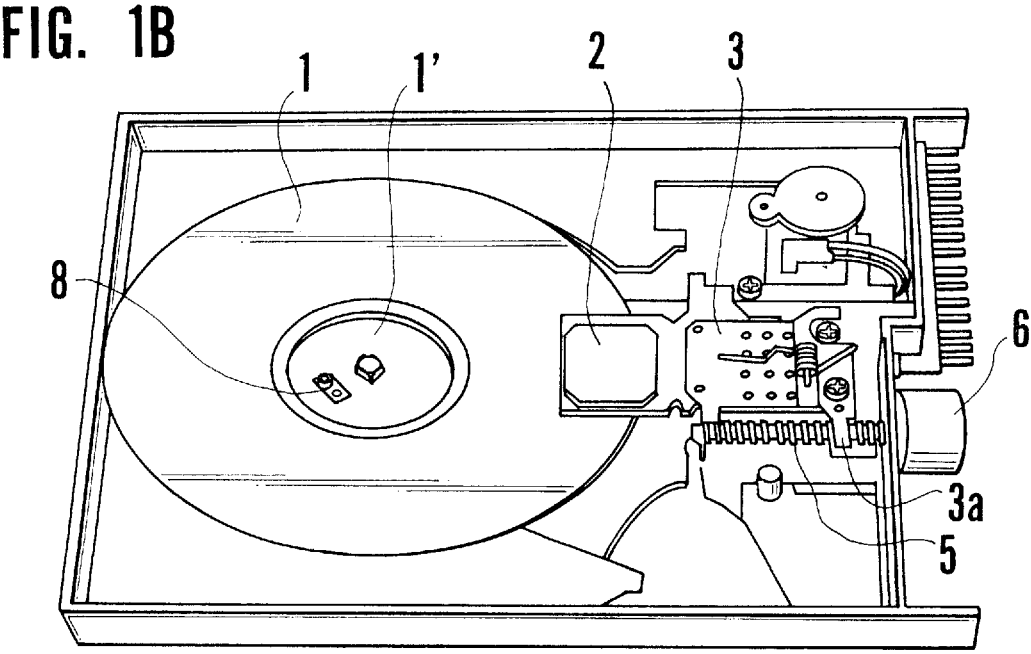

FIGS. 1(a) and (b) show only those parts of the structure of a 3.5-inch FDD which are necessary in order to describe the present invention. FIG. 1(a) shows a recording disk in a released state; and FIG. 1(b) shows a recording disk in an engaged state.

In FIGS. 1(a) and (b), 1 is a disk-shaped recording medium (hereafter, called "recording disk"): magnetic particles are coated onto both surfaces of this recording disk 1, and a dish-shaped steel chucking hub 1' containing two holes is fitted to the center portion thereof. The whole recording disk 1 is housed in a plastic case (omitted from drawing) in order to protect the surfaces of the recording medium and improve portability.

2 denotes a magnetic head, which contacts the recording disk 1 and reads out information recorded on this recording disk 1, in the form of magnetic variations in the magnetic particles, by means of a coil in the magnetic read-out head 2. Furthermore, information is written in by applying magnetic variations to the magnetic particles in the recording disk 1 by means of the recording head 2.

In other words, the magnetic head 2 has the functions of reading out information stored on the recording disk 1, and writing information onto the recording disk 1.

3 denotes a part called the head carriage, the magnetic head 2 being-attached to the end region thereof.

The head carriage 3 is a mechanism for moving the magnetic head 2 linearly to an appropriate location (track) on the recording disk 1, and it comprises an actuator motor 6, and a screw 5 which converts the rotational movement thereof to linear movement. In order to convert the rotational movement to linear movement, a portion 3a of the head carriage 3 fits into the grooves in the screw 5, and hence, when the screw 5 rotates, the whole head carriage 3 makes linear movement. In this way, the magnetic head 2 can be moved as appropriate to a desired track position on the recording disk 1 by means of a position instruction supplied to the actuator motor 6 (determined by a number of pulses supplied to the actuator motor 6).

7 denotes a spindle motor for directly driving in rotation the recording disk 1 which relates precisely to the present invention. A chucking mechanism 8, which rotates the steel chucking hub 1' at the center of the recording disk 1, whilst holding it in a stable state, is provided at the end of the rotating portion of said motor 7. As a result, the recording disk 1 rotates stably in a state whereby it is clamped directly to the chucking mechanism 8 of the spindle motor 7.

A more detailed description of the structure and operation of a 3.5-inch FDD itself is omitted here, and below, the spindle motor 7 for driving the recording disk 1, which is important in the present invention, will be described.

Figure 2:
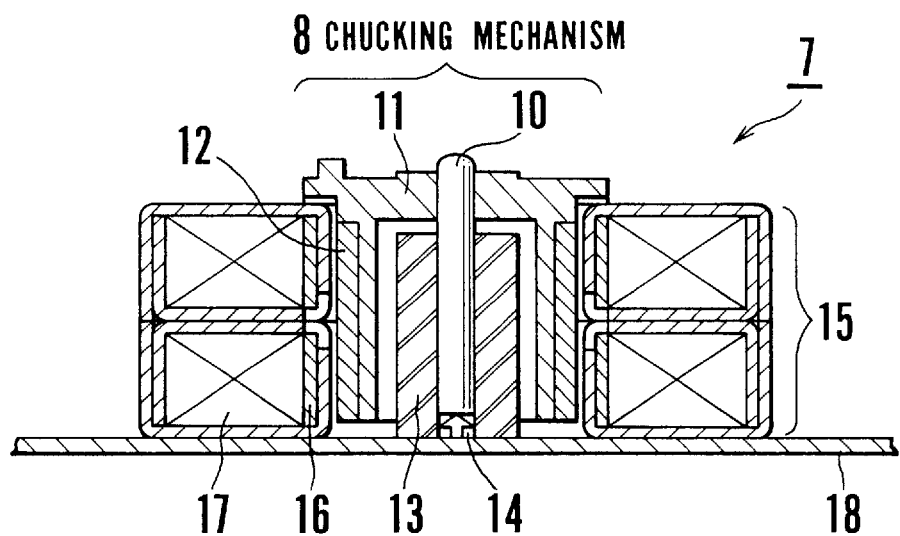
FIG. 2 shows a section of an inner rotor-type two-phase claw pole motor as an embodiment of the present invention.

FIG. 2 shows a section of a two-phase claw pole stepping motor which is particularly effective as an embodiment of the present invention. The actual structure of the motor is that of a standard claw pole stepping motor as shown in FIG. 2, the only point of difference being that, as stated previously, a chucking mechanism 8 for interfacing in order to drive a recording disk is fitted at one end of the rotor section. Accordingly, giving a simple description of the motor structure, a cylindrical hub 11 is fixed to the upper portion of a spindle 10 which extends vertically in the center region of the motor, and a magnet 12 is fixed to the outer rim of the hub 11. The spindle 10 is supported by an axle bearing 13 and a thrust bearing 14. A ring-shaped stator yoke 15 is provided on the outer side of the magnet 12, separated therefrom by a small gap, and inside this stator yoke 15, a coil 17 is wound about a core 16. This assembly is attached to a motor mounting plate 18.

An object of the present invention is to find a way of achieving smooth rotation or high rotational accuracy using a stepping motor based on a step operation, in other words, a way of setting the step number, detent torque and moment of inertia of the total rotating portion in a motor, appropriately, without altering the basic mechanism of the motor. Below, a two-phase claw pole stepping motor is described as an example, but the technological concepts of the present invention may naturally be applied to all types of stepping motor.

In general, a stepping motor is driven at a constant rotational speed in synchronization with an input clock. In a stepping motor, whilst the average speed matches a target value (by synchronization to an input clock), due to the inherent-step movement of the motor's basic operation, the motor alternates between high speed and low speed (the speed is irregular), when observed closely; in other words, rotational accuracy is poor.

This rotational accuracy is an especially important factor in a spindle motor driving a recording medium in an information recording device, and it must be kept below a certain value in order that the information stored on the recording disk can be accessed accurately Generally, in order to improve rotational accuracy in a rotating body, for example, 1) The moment of inertia of the rotating portion at its rotating axis is increased. (Increasing inertia effect)
2) The rotational speed is increased. (Increasing inertia effect)

Furthermore, in a driving system using a stepping motor,

3) The number of basic steps is increased. (Producing smooth rotational torque)
4) The detent torque is reduced. (Reducing disturbance factors) or the like.

On the other hand, as described previously, there is also the rotational accuracy required id the device (required rotational accuracy). In other words, 5) Required rotational accuracy:

This is a value determined according to the device to ensure accurate accessing of information. Therefore, since a rotational speed feedback loop is not employed in systems using a stepping motor, it is particularly necessary that these factors are correctly combined.

For example, in order simply to improve rotational accuracy, the detent torque should be lowered, and the moment of inertia, rotational speed, and basic step number should be increased. However, rotational speed is predetermined by the conditions of the device, and cannot be changed. Factors which can be changed in a motor are the moment of inertia, the basic step number, and the detent torque. The moment of inertia is related to the motor dimensions allowed by the device, and the motor size is naturally limited. Furthermore, even within the dimension limits, if the motor is made too large, although rotational accuracy is good, a reciprocal problem arises in that the start-up time becomes longer. Therefore, in cases where a stepping motor is installed in a device as a spindle motor, it is of course necessary to determine these physical relationships logically.

In other words, in the present invention, a logical correlation is formed between the aforementioned factors 1) to 5) and the rotational accuracy $\eta$, due to the motor structure, as determined by means of various experimentation and physical laws, and, separately from this, between these factors and the required rotational accuracy $\eta a$, for ensuring data access in the device.

Namely, rotational accuracy is raised firstly by properly coordinating the electrical energy input intermittently at constant time intervals (in a stepping motor, this energy is supplied by switching excitation at a timing synchronized to an input clock, regardless of the load state), with the moment of inertia of the rotating portion, at the rated rotational speed for ensuring rotational accuracy. Stated differently, the rotational accuracy is raised by smoothly converting (storing) the intermittently input electrical energy into mechanical energy, by means of adding suitable moment of inertia. In such case, it is advantageous for the moment of inertia of the rotating portion to be large, and as a result, cases may occur where the motor cannot self-start at the rated rotational speed. In such cases, it is of course necessary to add a start-up circuit to the device, whereby the motor is driven by a commonly used lamp circuit (a circuit which drives at a low frequency in the initial start-up period, and then gradually raises the frequency to synchronize with the rated rotational speed.)

In specific terms, at the rated rotational speed for ensuring rotational accuracy, taking the moment of inertia of the total rotating portion at its rotating axis as $J$ (g·cm$^2$), the rotational speed as n (rps), the basic step number as N (steps), the peak-to-peak value for detent torque as 2 Td (g·cm), and the peak-to-peak value for the required rotational accuracy as $\eta a$ (%), correlations were formed with regard to the five points given below.

These are namely:

1) The motor's detent torque was taken as the only factor (disturbance torque) degrading rotational accuracy. Moreover, the frequency of this detent torque was taken as half the basic step number in the motor.

Figure 3:
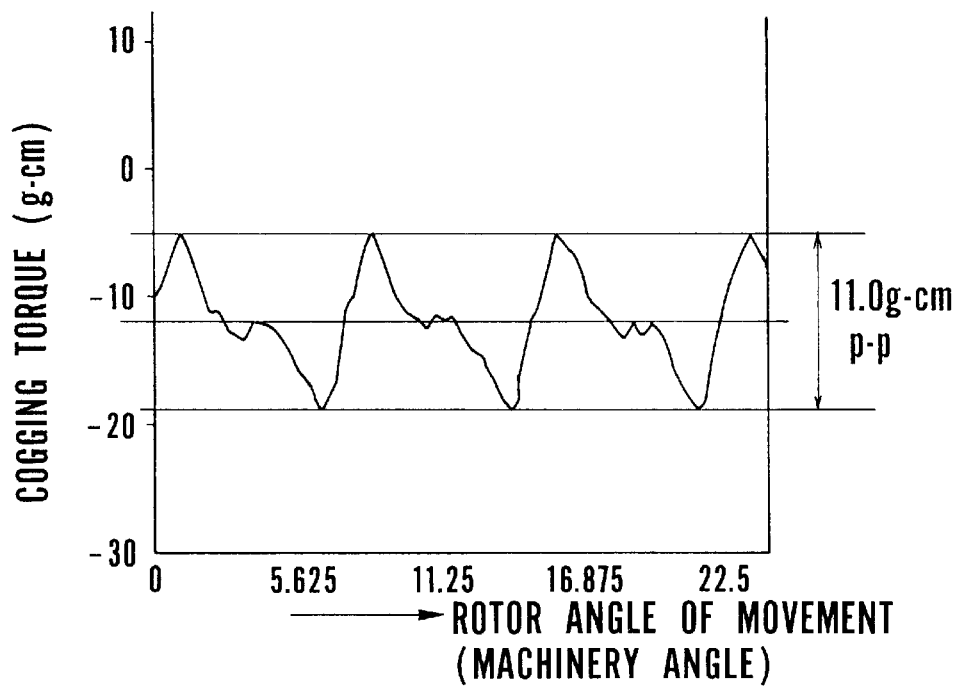
FIG. 3 shows a waveform for detent torque (22.5 degrees) for the embodiment shown in FIG. 2.

FIG. 3 shows the detent torque waveform in one embodiment of the present invention over a rotation of 22.5 degrees. The motor is composed such that N=96 (steps), Td=5.5 (g·cm), J=35 (g·cm$^2$), and n=5 (rps). From FIG. 3, it can be seen that the detent torque waveform is slightly distorted compared to a sine wave, and the number of waves in 360 degrees is 360°×3/22.5°=48 (96/2=48).

The detent torque can be regarded as the sole source of disturbance torque for the following reason. Generally speaking, factors which degrade rotational accuracy include those due to variation in frictional torque, imbalances in the mechanism (shifting of the core of the rotating portion, deviation in the dynamic balance, or the like), magnetic imbalances (unevenness in the received magnetic field, irregular spacing, or the like), and temporal change in the excitation conditions, and it is necessary to take all of these factors into consideration, together.

However, it is known from experimentation that in an information recording device where high rotational accuracy is demanded, the aforementioned variation in frictional torque, mechanical imbalances, magnetic imbalances, and the temporal change in the excitation conditions, are all small factors (since the required rotational accuracy cannot be obtained unless these factors are deliberately reduced in constructing the device), and as a result, detent torque should be regarded as the only disturbance element.

2) When a motor is rotating at its rated rotational speed (rps), the disturbance torque varies in the shape of a sine wave of the equation Td·sin (N/2)·$\omega_o$t, where $\omega_o$=2π n (rad/s).

Figure 4:
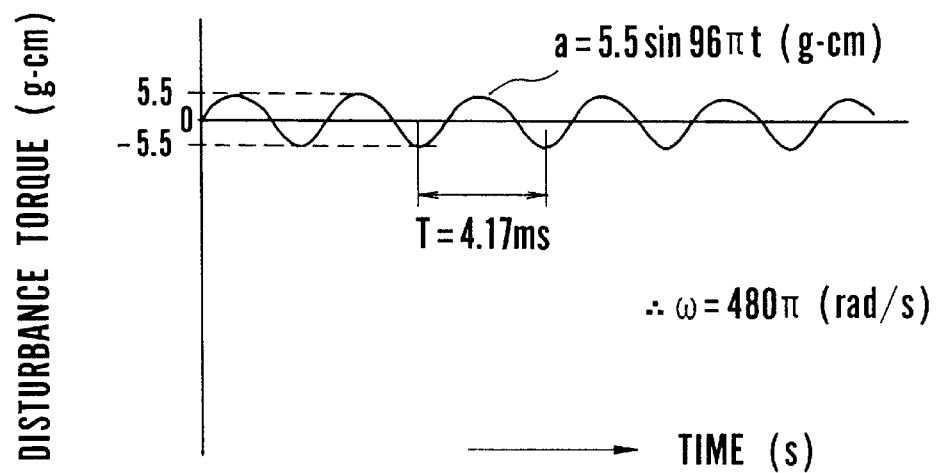
FIG. 4 shows a waveform associated with rotation, when a sine wave whose peak values coincide with the detent torque waveform shown in FIG. 3 is caused to rotate at a rated rotational speed n.

In the aforementioned embodiment, a sine wave is used whose peak values coincide with the detent torque waveform shown in FIG. 3. If this waveform is caused to rotate at the rated rotational speed, the waveform for disturbance torque, a (g·cm), accompanying this rotation will be as shown in FIG. 4. When expressed as a specific equation, the disturbance torque a (g·cm) is expressed in formula (2).

$$a = 5.5 \times \sin 96\pi nt \text{ (g·cm)} \tag{2}$$

3) According to physical laws, it is possible to regard the disturbance torque "a" as generating a standard rotational variation $\omega$. In order to find the amount of rotational variation $\omega$, in the case of item 2) above, the disturbance torque "a" is integrated with respect to time, and then divided by the moment of inertia J of the total rotating portion.

If specific number values are introduced in the aforementioned embodiment, and $\omega$ is calculated taking units into consideration, then $$\omega = 1/J \int a \cdot dt = -0.102 \cos 96\pi nt \text{ (rad/s)} \tag{3}$$

Moreover, to express this rotational variation $\omega$ in terms of a rotational variation "b" per unit time, $\omega$ is divided by $2\pi$ to yield $$b = -0.0163 \cos 96\pi nt \text{ (rps)} \tag{4}$$

Therefore, the maximum value for rotational variation in the aforementioned embodiment is 0.0163 (rps). The minus sign in the formula (3) and (4) above indicates that the phase is shifted by 180° (inverted).

4) In order to find the peak-to-peak value for rotational accuracy $\eta$ from the rotational variation "b" derived above, which changes sinusoidally, the maximum value of b in item 3) is doubled and then divided by the rated rotational speed "n" and expressed as a percentage. If units are combined in the expression, Formula (5) is obtained.

$$\begin{aligned}\eta &= 2 \times 980 \times 100 \times Td/(N/2 \cdot J \cdot \omega^2) \\ &= 98000\, Td/(\pi^2 n^2 \cdot J \cdot N)\, (\%)\end{aligned} \tag{5}$$

If this is calculated for specific values in the aforementioned embodiment, then the peak-to-peak value for rotational accuracy $\eta$ is expressed by formula (6).

$$\eta = 0.0163 \times 2/5 \times 100 = 0.652 \text{ (\%)} \tag{6}$$

If the rotational accuracy is expressed as an effective value (rms), for example, rather than a peak-to-peak value, it becomes $$\eta \text{ (rms)} = 0.0163 \times 0.707/5 \times 100 = 0.230 \text{ (\%)} \tag{7}$$

although this is superfluous.

In this way, the rotational accuracy $\eta$ must of course be changed depending on how it is defined.

5) In the present invention, a device was constructed by determining the relationship between the rotational accuracy $\eta$ (%) found from experimentation, physical laws, and the like, in 1) to 4) above, and completely separate to this, the required rotational accuracy $\eta a$ (%) necessary in order to ensure data access in the device, such that $$\eta \leq \eta a \tag{8}$$

As a result, it was possible readily to satisfy the required rotational accuracy in the device, without altering the basic composition of the motor, by simply setting each of the parameters such that the above relationship is satisfied.

The rotational accuracy $\eta$ and required rotational accuracy $\eta a$ in the aforementioned embodiment are, respectively, $\eta=0.652$ and $\eta a=1.2$ (the reason why $\eta a=1.2$ in the present embodiment will be described later), and thus the condition, $\eta \leq \eta a$, is fulfilled satisfactorily.

Incidentally, in the case of an FDD as described in the present embodiment, the required rotational accuracy $\eta a$ is specified in terms of ISV (Instant Speed Variation) during actual read-out of information on the recording medium via the magnetic head, and the practical value for this is 4% or less. ISV indicates the instant maximum speed variation, and furthermore, since this value is derived via the magnetic head, it differs from pure rotational accuracy found from physical laws on the assumption of linear conditions, as described above.

Therefore, in the present invention, upon deriving the ISV and required rotational accuracy $\eta a$ by means of experimentation, it was found that ISV=3.33 $\eta a$ is suitable. This means that when effects appearing unexpectedly via the magnetic head are taken into consideration, with respect to the rotational accuracy values $\eta$ and $\eta a$, which are effects of rotational variation that appear in a repeating sinusoidal form, then the ISV must be multiplied by a factor of 3.33 (for more detail, see experimental data in FIG. 5).

From the foregoing, the rotational accuracy $\eta$ (%) in the case of an FDD can be expressed by the relationship in formula (5) above, in terms of the structural parameters of the motor, Td, n, J and N, alone, yielding $$\eta \leq 1.2 \text{ where } n=5 \text{ (rps)}$$

Figure 5:
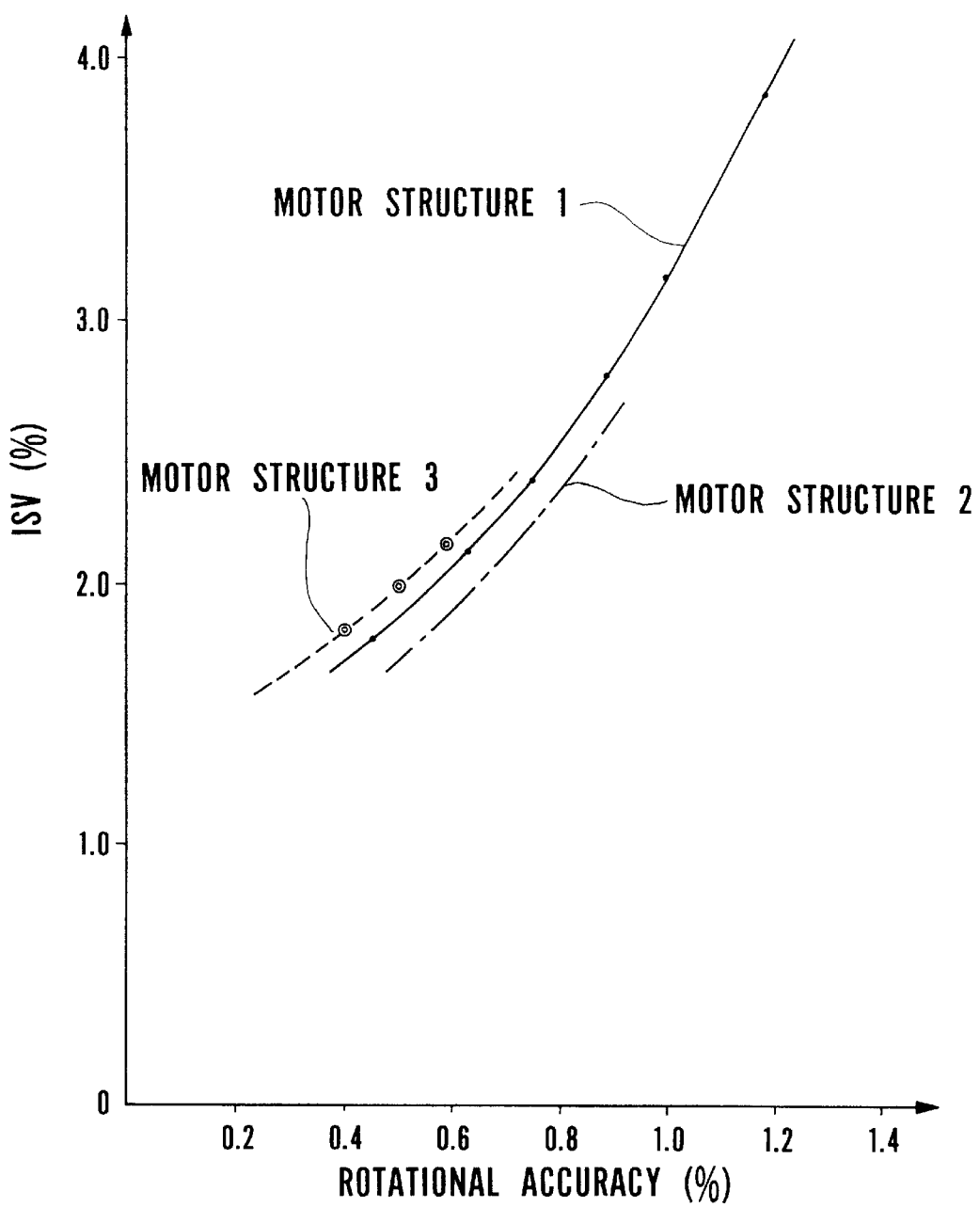
FIG. 5 represents the relationship between the rotational accuracy $\eta$ and ISV in experimentation.

FIG. 5 shows the relationship between $\eta$ and ISV in experimentation. From FIG. 5, the aforementioned relationships are shown to be appropriate. FIG. 5 shows results for three different motor structures (motor structures 1 to 3), and in this experiment, the rotational accuracy $\eta$ for the different motor structures was found by raising the inertia J and actually measuring the ISV in an FDD, with respect to the different moment of inertia values for J.

In motor structure 1, N=60 (steps) and Td=6.4 (g·cm); in motor structure 2, N=96 (steps) and Td=8.8 (g·cm), and in motor structure 3, N=96 (steps) and Td=5.5 (g·cm). Furthermore, the moment of inertia of a recording disk used in a 3.5-inch FDD is approximately 10 (g·cm$^2$), and in the present experiment, it was treated as having a value of 10 (g·cm$^2$).

Figure 6:
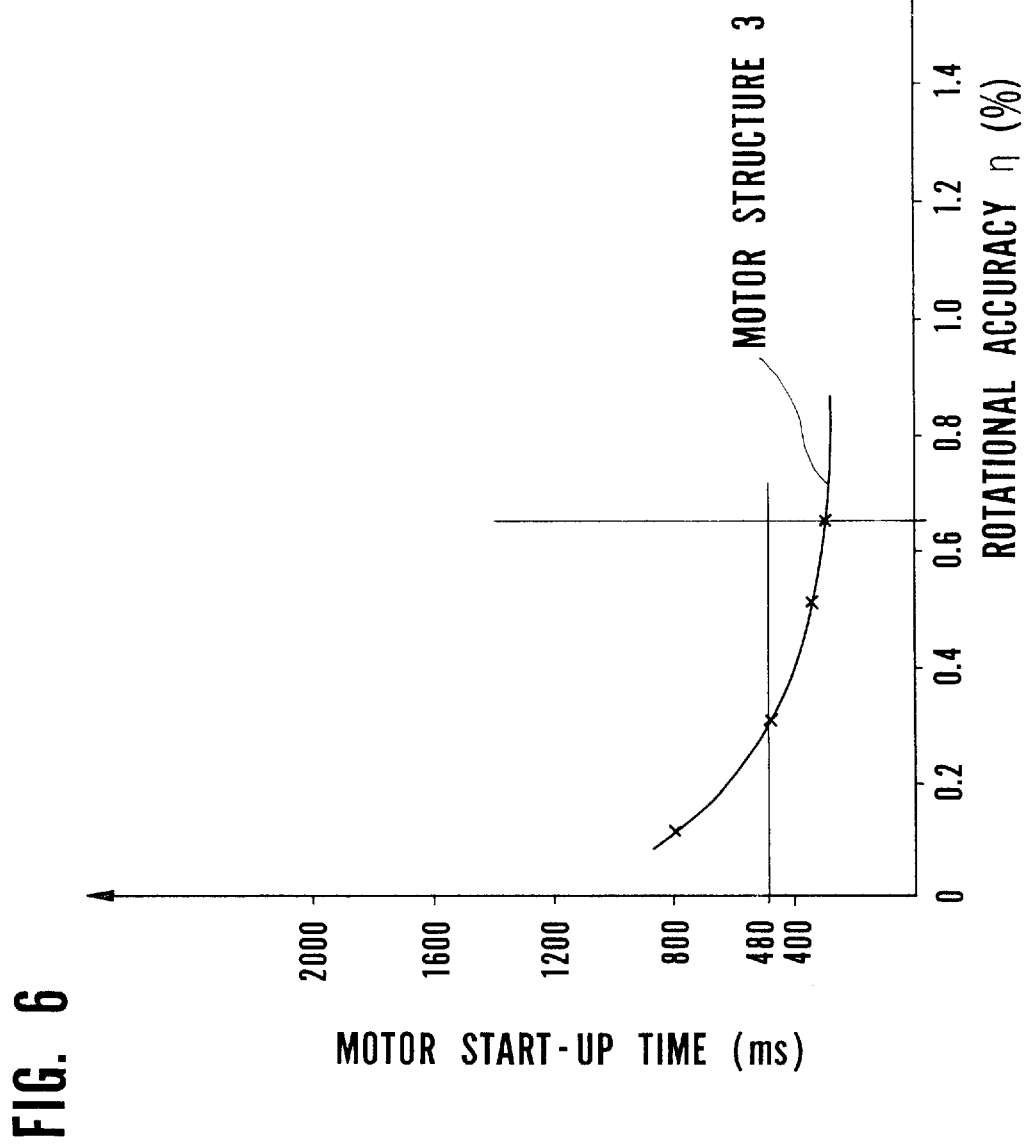
FIG. 6 represents results measured for the relationship between the rotational accuracy $\eta$ and start-up time, by experimentation.

Next, to discuss the minimum value for rotational accuracy $\eta$ as stated previously, if the moment of inertia J of the total rotating portion is increased, then, theoretically, the rotational accuracy $\eta$ (and ISV) can be reduced infinitely. However, increasing the moment of inertia of the rotating portion causes the motor start-up time to increase, and this poses a problem in a disk drive. Therefore, the relationship between the rotational accuracy $\eta$ and the start-up time were measured by experimentation, in order to determine the minimum rotational accuracy $\eta$, as limited by start-up time, in the case of an FDD. The corresponding results are shown in FIG. 6, which relates to motor structure 3. From FIG. 6, the minimum rotational accuracy $\eta$ satisfying an FDD start-up time specification of 480 ms maximum, is 0.29. Therefore, if a margin is allowed in the rotational accuracy $\eta$, and it is considered along with the maximum conditions for the rotational accuracy $\eta$ described above, then the range for the rotational accuracy $\eta$ in an FDD is $0.3 \leq \eta \leq 1.2$.

These values for rotational accuracy $\eta$ are based on the premise of a 480 ms maximum start-up time, so they will of course vary if there are changes in specifications for rotational accuracy and start-up time, for reasons such as future increases in the drive recording density.

Thereupon, specific study was made of the range for the basic step number N (steps) in a 3.5-inch size FDD which is the smallest format.

The minimum value for the basic number of steps is determined by the conditions for required rotational accuracy, as described previously. On the other hand, the maximum value is determined by mechanical processing constraints in allocating pole teeth on the stator yoke. In a 3.5-inch FDD, the maximum dimension of the motor is a diameter D of approximately 60 mm due to the size of the recording disk, and its height "h" is 8 mm at the most, due to the thickness of the drive. If the motor is an inner rotor-type, as in the present embodiment, a rotor diameter of half the external diameter, namely, 30 mm, or less, is suitable from the viewpoint of motor balancing. On the other hand, in a claw pole stepping motor, theoretically, the detent torque should be zero when the motor is in a state of magnetic balance, but in fact, it is high and is difficult to keep below Td=5 (g·cm). To simplify, if a rotor section of diameter 30 mm and height "h" 7.5 mm is made from a cylinder of 6.5 (g/cm$^3$), including the magnet, then its inertia will be approximately 35 (g cm$^2$).

From the range for $\eta$ of $0.3 \leq \eta \leq 1.2$ found previously using these values, the basic step number N (steps) can be derived to be $48 \leq N \leq 189$. If the motor is a two-phase claw pole stepping motor, then the number of basic steps N is multiplied by a factor of 4, and hence becomes $48 \leq N \leq 188$. The maximum basic step number of N=188 (steps) is regarded as a maximum since it is the limit in pole tooth processing using current pressing techniques, in a stator yoke of approximately 1 mm thickness.

Moreover, there is also a relationship between the rotor diameter and basic step number, and the rotational accuracy. It would appear to be possible to change the range of the previously determined basic step number N significantly, by changing the rotor diameter, but although it is considered advantageous from the viewpoint of rotational accuracy if the rotor diameter is increased, as this enables the number of allocated steps in the stator to be raised, the detent torque will increase proportionally as the diameter becomes larger, thereby degrading rotational accuracy. Conversely, if the rotor diameter is reduced, the moment of inertia is dramatically lowered, and at the same time, the number of steps which can be allocated to the stator is limited, and it therefore becomes extremely difficult to maintain rotational accuracy.

Accordingly, unless the motor size is significantly altered due to the aforementioned conditions, it is not possible to change the basic step number N by a large amount by means of the rotor diameter. As a result, in a spindle motor for a 3.5-inch FDD, the range of the basic step number N is $48 \leq N \leq 188$.

Figure 7:
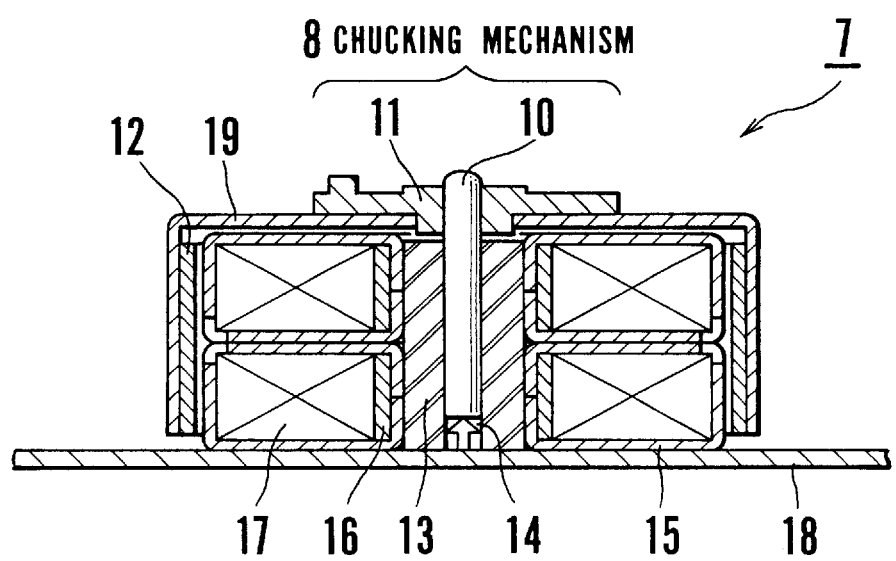
FIG. 7 shows a section of an outer rotor-type motor.

In the foregoing, an inner rotor-type motor was described, but with an outer rotor-type motor also, the range of the basic step number N is the same. This is because outer rotor-type motors, whilst advantageous in terms of moment of inertia, have a drawback in that detent torque is raised due to both to the larger diameter and the promotion of magnetic saturation caused by the increased magnetomotive force of the magnet, and thus the effects are cancelled out. Consequently, an outer rotor-type motor cannot be perceived as having any inherently beneficial structural conditions. A structural example of an outer rotor-type motor is shown in FIG. 7. Compared to the inner rotor-type motor illustrated in FIG. 2, the outer rotor-type motor is different only in that the stator and rotor positions are reversed. Namely, in an outer rotor-type motor, the stator is on the inside and a rotor containing a magnet rotates on the outer side thereof. To give a simple description of the structure of the outer rotor-type motor shown in FIG. 7, a spindle 10 is held by an axle bearing 13 and a thrust bearing 14 attached to a motor mounting plate 18, and a hub 11 is fixed to the upper portion of the spindle 10. A bowl-shaped rotor yoke 19 is fixed to the hub 11 and a magnet 12 is attached to the inner surface of this rotor yoke 19. Furthermore, on the motor mounting board 18, a coil 17 is wound about a core 16 inside the stator yoke 15, the coil 17 being slightly separated from the magnet 12 on the inner side of the rotor yoke 19. The point where a chucking mechanism 8 engages with the upper surface of the rotor is the same as in the inner rotor-type motor shown in FIG. 2.

The next factor is detent torque, which, desirably, should be low from the viewpoint of maintaining high rotational accuracy, since it causes disturbance, as stated previously. One point requiring particular attention with regard to this detent torque is the fact that it is not produced by magnetic saturation effects, as mentioned in the description of an outer rotor-type motor. This is because magnetic saturation is a non-linear phenomenon, and it is not in a region where the aforementioned physical laws apply. Considering the detent torque value in view of this, in a 3.5-inch FDD motor having approximate external dimensions of 60 mm×8 mm thick, Td must be $Td \leq 20$ (g·cm).

As described above, according to the present invention, it is possible to use an inexpensive stepping motor (a two-phase stepping motor is particularly effective) as a spindle motor for use in an information recording device, such as an FDD, and significant cost reduction in recording devices can be achieved. Furthermore, in this, since the required rotational accuracy can be obtained simply by setting the motor step number, rotor inertia and detent torque appropriately, without altering the structure of the motor, there is no increase in cost. There is no need to adopt a special drive system for the motor (standard digital voltage drive is suitable), which not only means that the drive circuit itself is inexpensive, but also makes it possible to incorporate the actual motor drive circuit in a one-chip microcomputer built into the device.

What is claimed is:

1. In an information recording device using a stepping motor as a spindle motor for directly driving a recording disk for recording information at a constant speed having a moment of inertia of a total rotation portion at a rotating axis of said motor of J (g·cm$^2$) including a moment of inertia of the recording disk, a basic step number of N (steps), a peak-to-peak value of detent torque of 2 Td (g·cm), and a rated rotational speed of n (rps), and further wherein a required rotational accuracy of said motor, which is necessary in order to ensure data access in the device, is taken as $\eta a$ (%), the improvement comprising the values of J, N, Td and n of said motor being such that $\eta \leq \eta a$, where rotational accuracy values $\eta$ and $\eta a$ are calculated as peak-to-peak converted values and $\eta = 98000 \, Td/(\pi^2 n^2 \cdot J \cdot N)$ (%).

2. The motor for an information recording device according to claim 1, wherein said motor comprises a two-phase claw pole stepping motor.

3. The motor for an information recording device according to claim 2, wherein said motor is an FDD (Floppy Disk Drive) spindle motor, and the values of J, N and Td of said motor are set such that the value of said rotational accuracy $\eta$ (%) satisfies the following condition:

$0.3 \leq \eta \leq 1.2$ where the rated rotational speed, n, is set to 5 (rps).

4. The motor for an information recording device according to claim 1, wherein said motor is an FDD (Floppy Disk Drive) spindle motor, and the values of J, N and Td of said motor are set such that the value of said rotational accuracy $\eta$ (%) satisfies the following condition:

$0.3 \leq \eta \leq 1.2$ where the rated rotational speed, n, is set to 5 (rps).

5. The motor for an information recording device according to claim 4, wherein said motor is a 3.5-inch FDD spindle motor, and said basic step number N (steps) satisfies the following condition:

$48 \leq N \leq 188$

6. The motor for an information recording device according to claim 5, wherein said motor is a 3.5-inch FDD spindle motor, and said detent torque Td (g·cm) satisfies the following condition:

$Td \leq 20$ (g·cm)

7. A device for transferring information between a transducer and a rotatable medium, said device comprising:
   a) a stepping motor having a rotating portion;
   b) a chucking mechanism on said rotating portion of said stepping motor configured to clamp the rotatable medium on said stepping motor; and
   c) a transducer configured for transferring information between the rotatable medium and the transducer when said rotatable medium is rotated by said stepping motor;
   wherein the rotating portion of the stepping motor including the rotatable medium has a moment of inertia of J, and the stepping motor has a basic step number of N (steps), a peak-to-peak value of detent torque of 2 Td (g·cm), and a rotational speed of n (rps), and a required rotational accuracy of $\eta a$ (%) necessary to ensure data access in the device; and the values of J, N, Td and n of said stepping motor are such that $\eta \leq \eta a$, where rotational accuracy values $\eta$ and $\eta a$ are calculated as peak-to-peak converted values and $\eta = 98000 \, Td/(\pi^2 n^2 \cdot J \cdot N)$ (%).

8. The device of claim 7 and further comprising:
   a drive circuit electrically coupled to said stepping motor for driving rotation of said stepping motor; and
   an input clock synchronizing said drive circuit.

9. The device of claim 7, wherein said drive circuit is configured to drive said stepping motor during recording of information without feedback from motor position detectors and speed detectors.

10. The device of claim 9 wherein said chucking mechanism is configured to clamp a magnetic recording disk on said stepping motor, and said transducer is a magnetic recording head.

11. The device of claim 10 and further comprising:
    a drive circuit electrically coupled to said stepping motor for driving rotation of said stepping motor; and
    an input clock synchronizing said drive circuit.

12. The device of claim 7, wherein said stepping motor has a basic step number between 48 and 188, inclusive.

13. The device of claim 7, wherein said stepping motor is an inner rotor-type motor.

14. The device of claim 7, wherein said stepping motor is an outer rotor-type motor.

15. A method for transferring data between a recording disk and a transducer, the method comprising:
    a) determining a maximum acceptable value of ISV (instant speed variation);

b) determining a required rotational accuracy $\eta a_{max}$ from the maximum acceptable value of ISV;

c) mounting a recording disk on a rotating portion of a stepping motor having N steps, a peak-to-peak value of detent torque of 2 Td (g·cm), and a rotational speed of n (rps);

d) adjusting a moment of inertia of the rotating portion of said stepping motor in combination with the recording disk so that said moment of inertia is J (g·cm²);

e) selecting values of N, n, 2 Td, and J such that:

$\eta = 98000\ Td/(\eta^2 n^2 \cdot J \cdot N)$ (%), and $\eta \leq \eta a_{max}$;

f) operably positioning a transducer to transfer data between the transducer and the recording disk; and g) operating the transducer to transfer data between the recording disk and the transducer.

16. The method of claim 15, further comprising the step of driving the stepping motor with a switching excitation synchronized to an input clock to rotate the recording disk while maintaining a sufficient rotational accuracy for recording data.

17. The method of claim 15, wherein the step of determining a maximum acceptable value of ISV comprises the step of measuring the ISV of the motor for differing moment of inertia values J.

18. The method of claim 17, and further comprising the steps of:

selecting a maximum motor start-up time;

determining a minimum rotational accuracy $\eta a_{min}$ required for meeting the maximum motor start-up time; and selecting values of N, n, 2 Td and J such that:

$\eta a_{min} \leq \eta \leq \eta a_{max}$.

19. The method of claim 18, wherein the driving step is performed without feedback sensing of rotational speed or motor position.

20. A device for transferring information between a transducer and a rotatable medium, said device comprising:

a) a stepping motor having a rotating portion and a basic step number between 48 and 188, inclusive;

b) a chucking mechanism on said rotating portion of said stepping motor configured to clamp the rotatable medium on said stepping motor; and c) a transducer configured for transferring information between the rotatable medium and the transducer when said rotatable medium is rotated by said stepping motor.

* * * * *